No. 624,664. Patented May 9, 1899.
H. LEINEWEBER.
BICYCLE PUMP HOSE ATTACHMENT.
(Application filed Dec. 10, 1898.)
(No Model.)
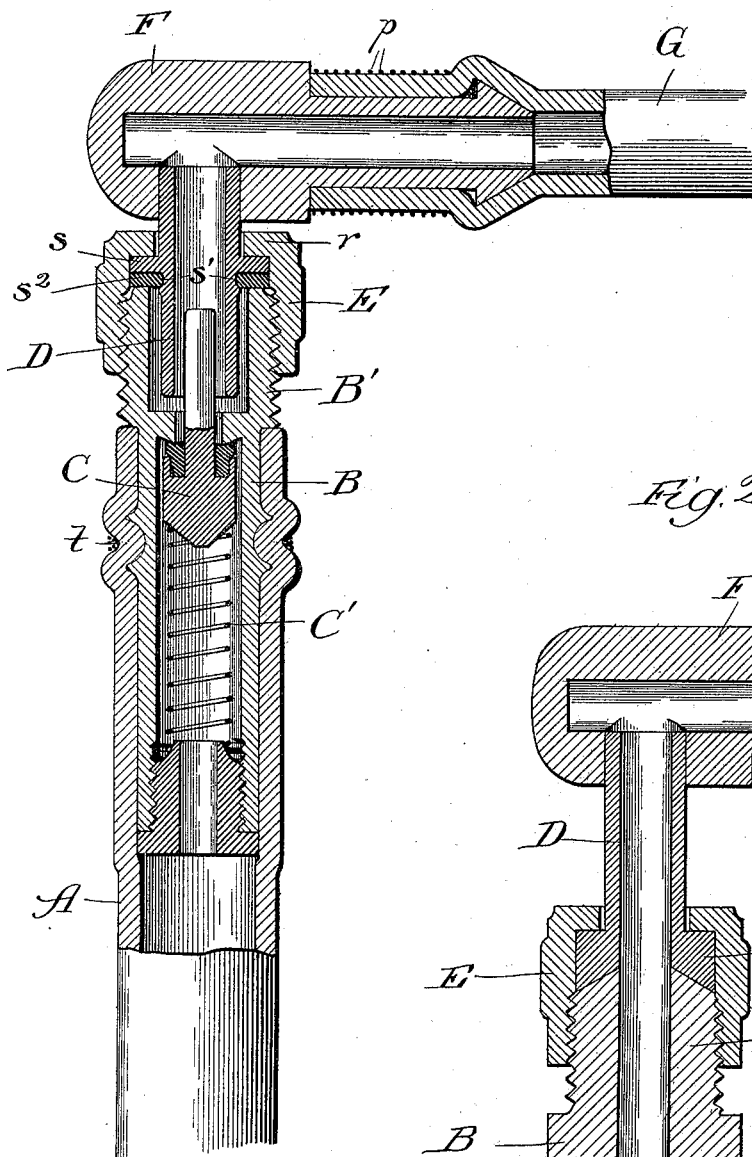
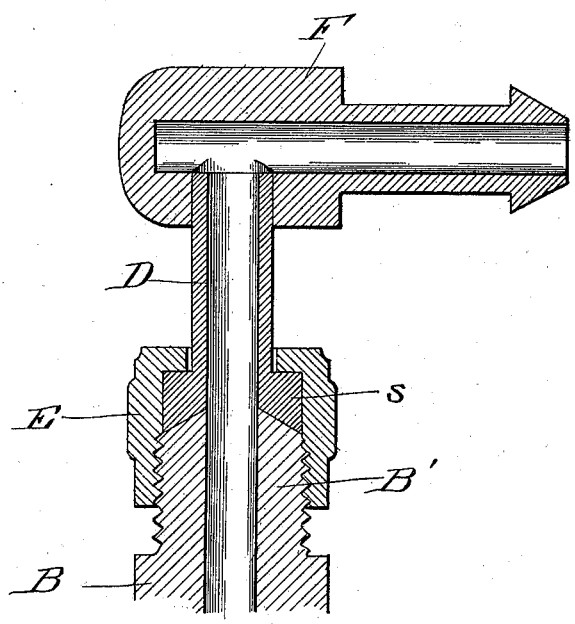

UNITED STATES PATENT OFFICE.

HERMAN LEINEWEBER, OF CHICAGO, ILLINOIS, ASSIGNOR TO GEORGE LEININGER, OF SAME PLACE.

BICYCLE-PUMP-HOSE ATTACHMENT.

SPECIFICATION forming part of Letters Patent No. 624,664, dated May 9, 1899.

Application filed December 10, 1898. Serial No. 693,841. (No model.)

*To all whom it may concern:*

Be it known that I, HERMAN LEINEWEBER, a citizen of the United States, residing at South Chicago, in the county of Cook and State of Illinois, have invented a new and useful Improvement in Bicycle-Pump-Hose Attachments, of which the following is a specification.

My invention relates particularly to an improvement in the connecting means for use in attaching a pump-hose to the valve-casing stem of a pneumatic tire.

My object is to provide a construction of attachment whereby an air-tight union between pump-hose and tire-valve may be formed handily and with less danger of loosening the valve or the valve-attaching tube than has hitherto attended the action of screwing on the hose-coupling, as incident to the structure of the coupling.

My improved coupling is shown in the accompanying drawings, in which—

Figure 1 is a sectional view showing the coupling applied to a valve of common construction, and Fig. 2 represents a slightly-modified form of the coupling as applied to a different form of valve.

A is the valve-attaching tube, which is cemented or otherwise suitably joined to the tire.

B is the valve-casing, within which is the common upwardly-seating valve C, held by a spring C'. The lower part of the valve-casing preferably fits within the attaching-tube and is secured thereto by a binding thong or ring $t$. The casing is provided with an exteriorly-threaded upwardly-projecting stem B'.

The union or attachment comprises a tubular part D, provided centrally of its length with an external flange $s$ and, fitting against the under surface of said flange and in a retaining-groove $s'$, with a washer $s^2$, of leather, rubber, or other suitable joint-sealing material, an interiorly-threaded sleeve E, which screws onto the stem B' and fits loosely about the flange $s$, above which it is provided with an internal annular flange $r$, which fits loosely about the upwardly-projecting portion of the tube D and bears at its upper surface upon the flange $s$, and a tubular attaching-stem F, secured rigidly to the upper end of the tube D and in communication therewith. The stem F is preferably at substantially a right angle to the tube D and serves to receive the adjacent end of the pump-hose G, which latter is securely fastened thereto by a thong or wire wrapping $p$.

It will be observed that with the above-described construction the tubular part D, of which the stem F is a continuation or extension, does not rotate with the nut E. Heretofore it has been the practice to make the part having screw connection with the valve-casing stem rigid with the hose G. Such a construction is unsuitable to its purpose for obvious reasons. Furthermore, with my improved construction the parts contacting with the washer $s^2$ move toward each other, exerting a simple compressive force upon the washer, while the friction, which would tend to rotate the part D, is entirely at the metallic surfaces of the upper side of the flange $s$ and lower side of the flange $r$, and this tendency may be overcome by using the stem F and attached hose as a handle for applying a counterbalancing turning moment.

In Fig. 2 the construction is modified slightly to suit a different form of valve. Here the washer $s^2$ and the downwardly-projecting portion of the tube D are dispensed with, the lower end of the part D being concaved to receive the conical upper end of the valve-casing stem B'.

What I claim as new, and desire to secure by Letters Patent, is—

The combination with a valve-casing provided with a threaded stem, of a tubular part D provided with an annular shoulder, a sleeve E threaded to fit said stem and provided with an annular shoulder, and a tubular stem F rigid with and substantially at right angles to the part D and in communication therewith, substantially as and for the purpose set forth.

HERMAN LEINEWEBER.

In presence of—
D. W. LEE,
R. T. SPENCER.